Dec. 4, 1923. 1,476,313
G. H. WENHAM
FOLDING HOOD FOR MOTOR ROAD VEHICLES AND OTHER VEHICLES
Filed Jan. 11, 1922 2 Sheets-Sheet 1
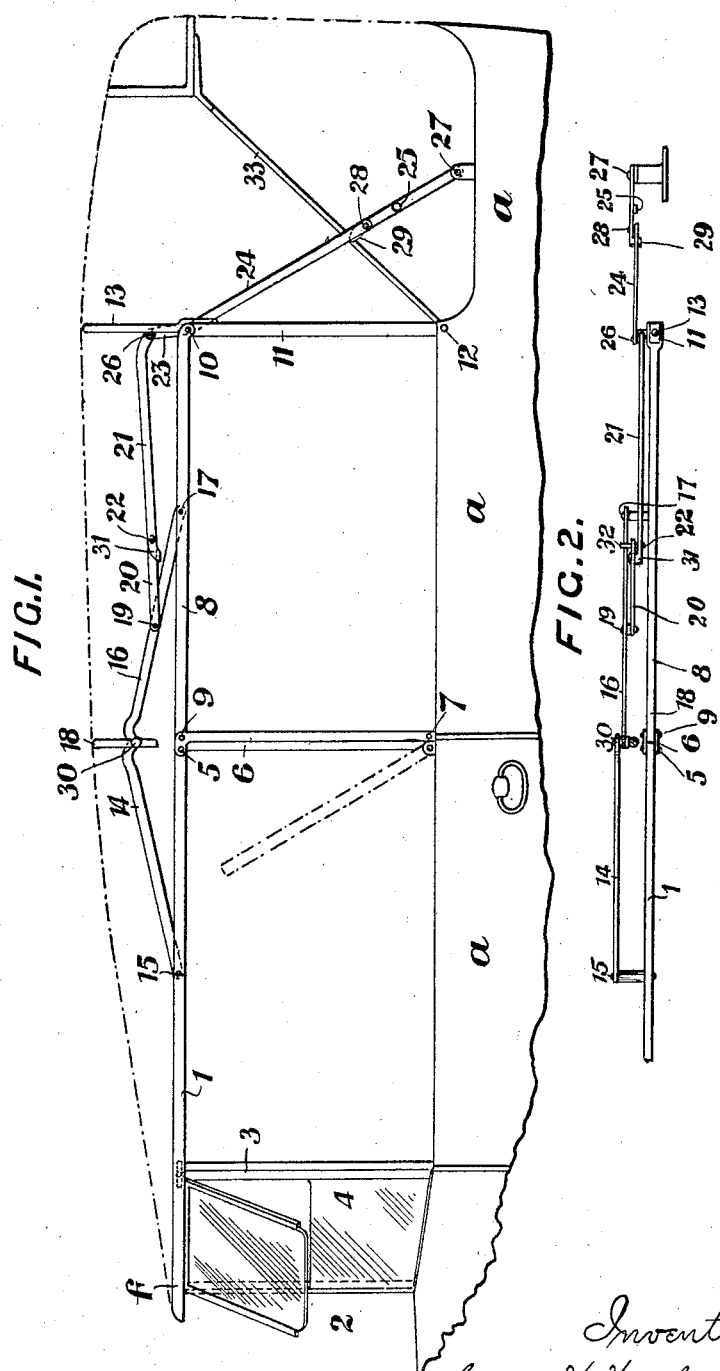

Dec. 4, 1923.                                                    1,476,313
G. H. WENHAM
FOLDING HOOD FOR MOTOR ROAD VEHICLES AND OTHER VEHICLES
Filed Jan. 11, 1922                   2 Sheets-Sheet 2

Inventor.
George H. Wenham,
By ............ Atty.

Patented Dec. 4, 1923.

1,476,313

UNITED STATES PATENT OFFICE.

GEORGE HAROLD WENHAM, OF BROMLEY, ENGLAND, ASSIGNOR TO G. BEATON & SON (1919) LIMITED, OF LONDON, ENGLAND, A CORPORATION OF GREAT BRITAIN.

FOLDING HOOD FOR MOTOR ROAD VEHICLES AND OTHER VEHICLES.

Application filed January 11, 1922. Serial No. 528,442.

*To all whom it may concern:*

Be it known that I, GEORGE HAROLD WENHAM, a subject of the King of Great Britain, residing at Charnwood Cottage, London Lane, Bromley, Kent, England, have invented certain new and useful Improvements in or Connected with Folding Hoods for Motor Road Vehicles and Other Vehicles, of which the following is a specification.

This invention relates to improvements in or connected with folding hoods for motor road vehicles and other vehicles, including motor-boats and other vessels, such hoods being of the type in which the framing comprises hinged pillars and hoop sticks with scissors joint levers or the like and devices for locking the hood in the raised condition.

As at present constructed, the framing is generally so devised that in raising the front part of the hood, the operator has, practically, to lift a great part of the weight of the entire hood and its framing because, as soon as the lifting commences, motion is communicated to the rear portions of the cant rails and rear pillars by links connecting one of the scissors levers on each side of the vehicle with the locking joint lever or strut and the rear pillar. If the strut be dispensed with, the hinged pillars often tend to assume an inclined, instead of a vertical position, due to the pull or strain, exerted by the head-covering, during fixing, or owing to the contraction or shrinkage of the material, of which the hood is made, and which frequently takes place after the head has become wet or badly creased. The result is that the raising and lowering of the windows or sashes becomes a difficult and, sometimes, impossible operation. To diminish the amount of energy required to raise a hood, it has been proposed to assist the raising of the hood and, conversely, to check its descent, during the lowering, by means of springs.

Now according to this invention, the springs are eliminated and means are provided for enabling the front portion of the cant rails to be raised to an, approximately, vertical position, or beyond, without communicating any motion or any appreciable amount of movement to the locking joint lever or strut, while the subsequent swinging over of the front portions of the cant rail, and part of the hood attached thereto, then has the effect, owing to their weight and position, of acting as a lever and materially assisting in raising the heavy rear portions of the hoods, the result being that the energy required to raise the hood is much less than is the case with hoods, as hitherto constructed, at least when unprovided with springs.

The invention is, conveniently, carried out by making the link, connecting the scissors-levers and an extension of the strut or locking joint-lever, jointed and providing a stop at the joint to prevent the link from flexing in more than one direction. The link is also, preferably, provided with a projection in the neighbourhood of the joint and adapted to come into contact with and be supported by the scissors lever in the course of the operation, involving the raising of the front portions of the cant rails in the course of lowering the hood.

In order that the invention may be readily understood, reference is made to the accompanying drawings, in which:—

Figure 1 is an outside elevation of the near side of the upper or head part of a motor car constructed according to this invention.

Figure 2 is a plan of the cant rails and levers shown in Figure 1.

Figure 3:
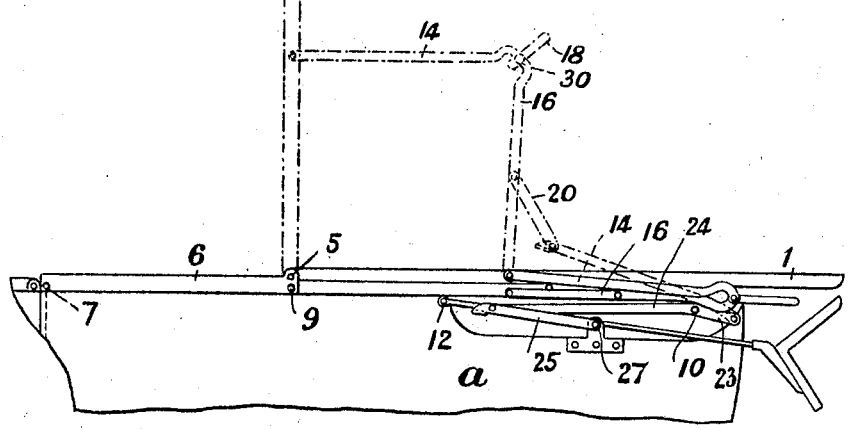
Figure 3 is an elevation of the inside of the offside showing the head or hood in the folded-down position, and showing in dotted lines the hood members partly raised or folded
Figure 4:
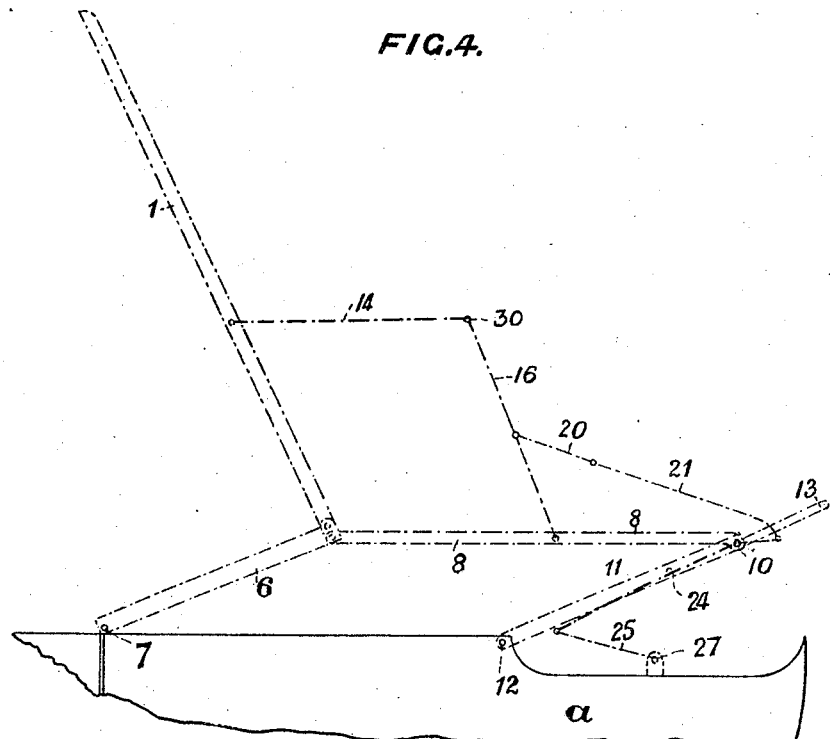
Figure 4 is a view showing diagrammatically the position the hood members assume during the further raising or unfolding of the hood.

In carrying the invention into effect and according to the construction shown on the drawings, the front portions 1 of the cant rails are rigidly connected to the front portion *f* of the hood frame. The front portion *f* of the hood frame or the cant rails on each side of the vehicle is or are, as usual, provided with holes or the like for engaging with the upper reduced ends of the pillars 2, 3 of the wind screen 4, which latter may either be flat or angular, as shown. The rear ends of the front parts 1 of the cant rails are each jointed at 5 to the front of the upper end of a pillar 6, hinged at the bottom at 7 to the top of the body *a* of the vehicle or to a fixed extension of this pillar, which extension is fixed to or forms part of the framing of the body. The rear portion 8 of each cant rail is, similarly, pivoted at its front end at 9 to the said pillar 6, and, consequently, to the rear of the joint 5 with the front cant rail portion 1, and the rear end of the rear portion 8 of the cant rail is, similarly, hinged at 10 to the upper end of a second pillar 11, also hinged, at its lower end 12, to the body a of the vehicle or otherwise, as aforesaid, and the usual rear hoop stick 13 is fixed to the upper end of the said pillar 11.

The front and rear portions 1 and 8 of the cant rails are connected from one side to the other by means of the usual scissors-levers or to levers or links connected to a hoop stick 18. The scissors-lever 14 is hinged to the front cant rail portion 1 at 15 and the other lever 16 is hinged to the rear portion 8 of the cant rail at 17. The rear scissors-lever or link 16 is connected at 19, to a link comprising two members 20 and 21, hinged together at 22 and connected to an extension 23 of the strut or locking joint-lever 24, 25 by a hinge 26. The link member 21 is also provided with an extension and stop 31 in front of the pivot 22. The lower end of the locking joint-lever 24, 25 is, as usual, hinged at 27 to the body a at some distance to the rear of the rear hinged pillar 11, while it is near its other end, hinged at 10 to the cant rail 8 as shown or it may be hinged to the rear pillar 11 or to the cant rail 8 only. As usual, the strut or locking joint-lever 24, 25, is hinged or jointed between its ends at 28 and the lever 25 is furnished with a stop 29 to prevent flexure of the locking joint-lever members in more than one direction or, at least, not greatly beyond the dead centre on one side, while being quite free to flex on occasion in the other direction. The scissors-levers either form the usual hoop-stick by extending across the inside of the hood or they comprise, as shown, two simple inter-connected connecting rods or link members 14 and 16 on each side and, at or near their junction, at 30, they are provided with or hinged to a hoop-stick 18 as aforesaid. The link members 20, 21 connecting the scissors-levers 16 or the like with the strut or locking joint-levers 23, 24, 25 are pivoted together and provided with a stop or stops such as 31. The stop 31 on the link member 21 permits the link members 20, 21, to flex or bend downwardly, but not to flex upwardly. In addition a projection or stop 32 (Figure 2) is provided on the hinged link 21 which is an extension of the intermediate pivot 22 of the link. When lowering the hood, this projection 32 of the pivot 22 is adapted to engage the link member or scissors lever 16, as the front part of the cant rail 1 is raised, thus affording a support to the hinged link 20, 21, to permit of exerting a thrust on the extension 23 at one end of the strut or locking joint lever 24 to cause the strut parts 24 and 25 to collapse. Conversely, when raising the hood, the link 20, 21 serves, as it straightens, towards the end of this operation, to pull the strut 24, 25 to its extended or rigid position. The back stick 33 is made in any suitable manner and is conveniently pivoted to the body at 12.

The framing suitably consists of light channel-section metal, except the scissors-levers, links, locking joint-levers, and hoop sticks, which may be of round, oval or rectangular section.

I claim:—

1. A hood frame for automobiles and other vehicles, comprising pillars hinged at one end to the body of the vehicle, cant rails hinged to the pillars, hinged locking-joint levers pivotally connected to the pillars and to said body, an upward extension on one of said locking-joint levers beyond its pivotal connection with said pillar, scissors-lever mechanism pivoted to the cant rails, and flexible means comprising hinged links arranged between said scissors-lever mechanism and said extension to allow the front portion of the cant rails, during the folding and unfolding of the hood, to be partly raised before flexing or straightening, respectively, of the locking joint levers takes place, and means to cause one of said links to become operative on said extension to flex said locking levers, substantially as and for the purpose set forth.

2. A hood frame for automobiles and other vehicles, comprising pillars hinged at one end to the body of the vehicle, cant rails hinged to the pillars, scissors-levers hinged together and pivotally connected to the cant rails, hinged locking joint levers pivotally connected to the pillars and to said body, an upward extension on one of the locking joint levers beyond its pivotal connection with said pillar, a two-part jointed link pivotally connected at one end to a scissors-lever and at the other end to said extension, means to limit the upward flexing of the jointed link parts, and an abutment on one of said link parts adapted to contact with said scissors-levers after the partial folding of the hood, substantially as and for the purpose set forth.

3. A hood frame for automobiles and other vehicles, comprising pillars hinged at one end to the body of the vehicle, cant rails hinged to the pillars, scissors-levers hinged together and pivotally connected to the cant rails, hinged locking joint levers pivotally connected to the pillars and to the car body, an upward extension on one of said locking joint levers beyond its pivotal connection with a pillar, a two-part jointed link pivotally connected at one end to a scissors-lever and at the other end to said extension, a continuation of one of the link parts beyond the joint of said link parts, and a lateral projection on said continuation adapted to contact with the under surface of the other link part to limit the upward flexing of said jointed link parts, substantially as set forth.

4. A hood frame for automobiles and other vehicles, comprising pillars hinged at one end to the body of the vehicle, cant rails hinged to the pillars, scissors-levers hinged together and pivotally connected to said cant rails, a back-stick hinged locking joint-levers, pivotally connected to the car body and to the pillars, an extension on one of the locking joint-levers, a two part joint link pivotally connected at one end to a scissors-lever and at the other end to said extension, a projection from the pivotal connection of the two-part link, adapted to contact with said scissors levers whereby one link part forms a thrust member operative upon said extension to flex said locking levers after the partial raising of the forward end of the hood when folding same, and a stop on one of said link parts to limit the upward flexing of the jointed links, substantially as set forth.

5. In a hood frame for automobiles and other vehicles, the combination with pillars hinged at one end to the body of the vehicle, cant rails made in parts hinged together and pivotally connected to the pillars, a transverse hood support hinged in proximity to the hinges of the cant rails and connected to the latter, and locking joint-levers hinged together and pivoted to the pillars and said body, of an extension on one of the locking joint-levers, a two part jointed link pivotally connected at one end to the hinged transverse hood-supporting means and at the other end to said extension, and means to limit upward flexing of the jointed link parts, substantially as set forth.

6. In a hood frame for automobiles and other vehicles, the combination with pillars hinged at one end to the vehicle body and on both sides of the vehicle, cant-rails made in parts hinged together and pivoted to the pillars, a pair of scissors-levers pivoted to the cant-rails on each side of the vehicle, a hoop-stick connecting said pairs of scissors-levers near their hinges and for transversely supporting the hood when in use, and hinged locking joint-levers pivotally connected to the pillars and to the car body, of an extension on one of the locking joint levers, a two part jointed link pivotally connected at one end to said extension and at the other end to a scissors-lever member, and a stop to limit the upward flexing of the said jointed link parts, substantially as set forth.

7. In a hood frame for automobiles and other vehicles, the combination with pillars hinged at one end to the vehicle body and on both sides of the vehicle, cant-rails made in parts hinged together and pivoted to the pillars, a pair of scissors-levers pivoted to the cant-rails on each side of the vehicle, a hoop-stick connecting said pairs of scissors-levers near their hinges for transversely supporting the hood when in use, and hinged locking joint-levers pivotally connected to the pillars and to the car body, of an extension on one of the locking joint-levers, a two part jointed link pivotally connected at one end to the said extension and at the other end to a scissors-lever member, a stop to limit the upward flexing of the jointed link parts, and an abutment of said jointed link adapted to bear against a support, whereby after the forward end of the hood has been raised one of said link parts forms a thrust member operative upon the locking joint-levers extension to effect the flexing of the locking joint-levers upon further raising the hood while folding the same, substantially as set forth.

8. In a hood frame for automobiles and other vehicles, the combination of pillars hinged at one end to the vehicle body and on both sides of the vehicle, cant-rails made in parts hinged together and pivotally connected to the pillars, a back-stick, a pair of scissors-levers pivoted to the cant-rails on each side of the vehicle, a hoop stick connecting said pair of scissors-levers near their hinges and adapted to form a transverse support for the hood, hinged locking joint-levers pivotally connected to the pillars and to the car body, an extension on the upper member of the locking joint-levers, a two part jointed link pivotally connected at one end to said extension and at the other end to a scissors-lever member, a lateral extension on one of the link parts and beyond the joint thereof adapted to contact with the other link part and form a stop to limit the link being flexed upwardly, and a pin projecting from the joint of the two part link adapted to rest on the adjacent scissors-lever member during an early stage in the folding operation of the hood substantially as and for the purpose set forth.

GEORGE HAROLD WENHAM.